April 8, 1930. F. C. STOLLE 1,753,811
ROAD MATERIAL SPREADER
Filed Feb. 29, 1928 3 Sheets-Sheet 1
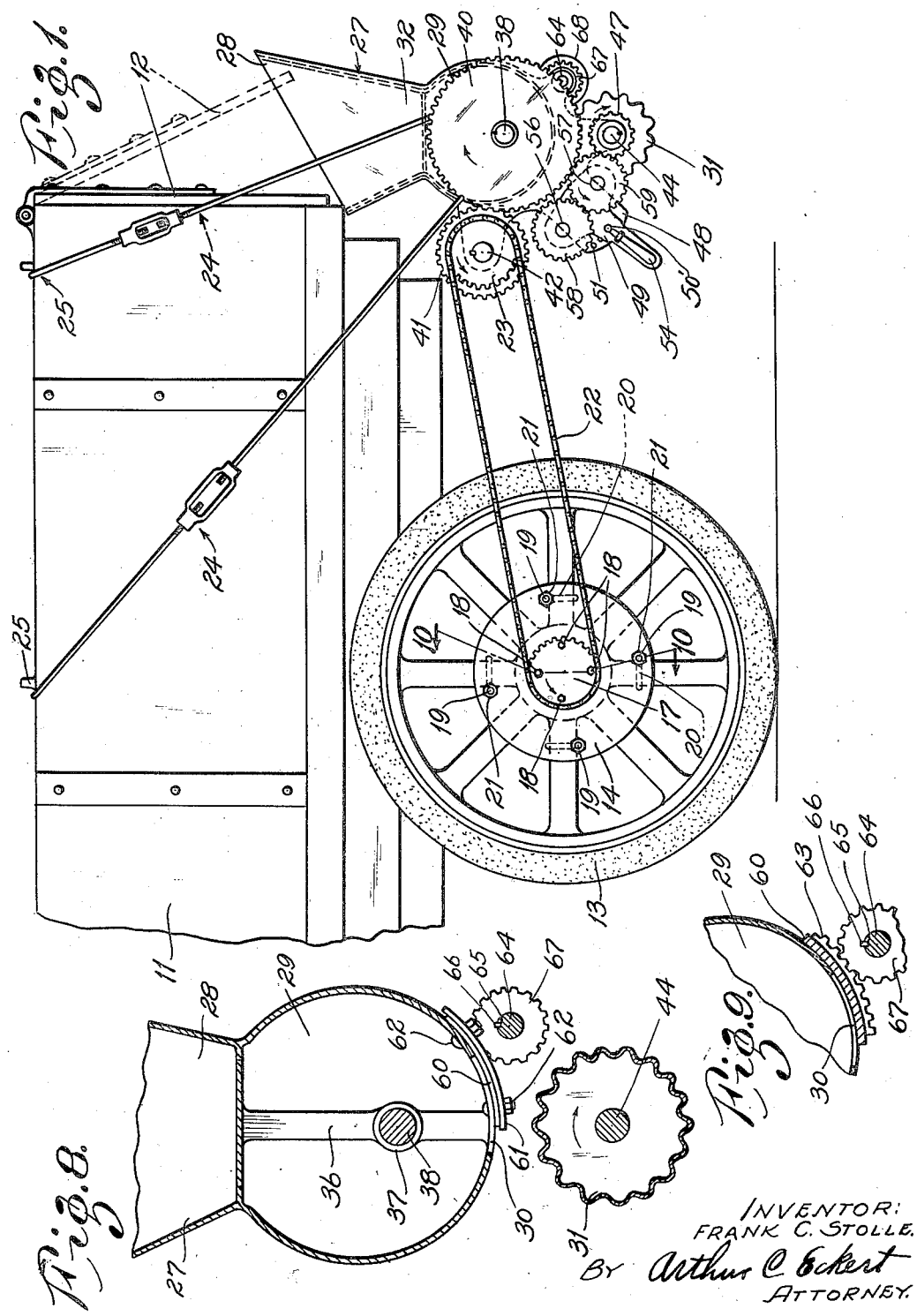

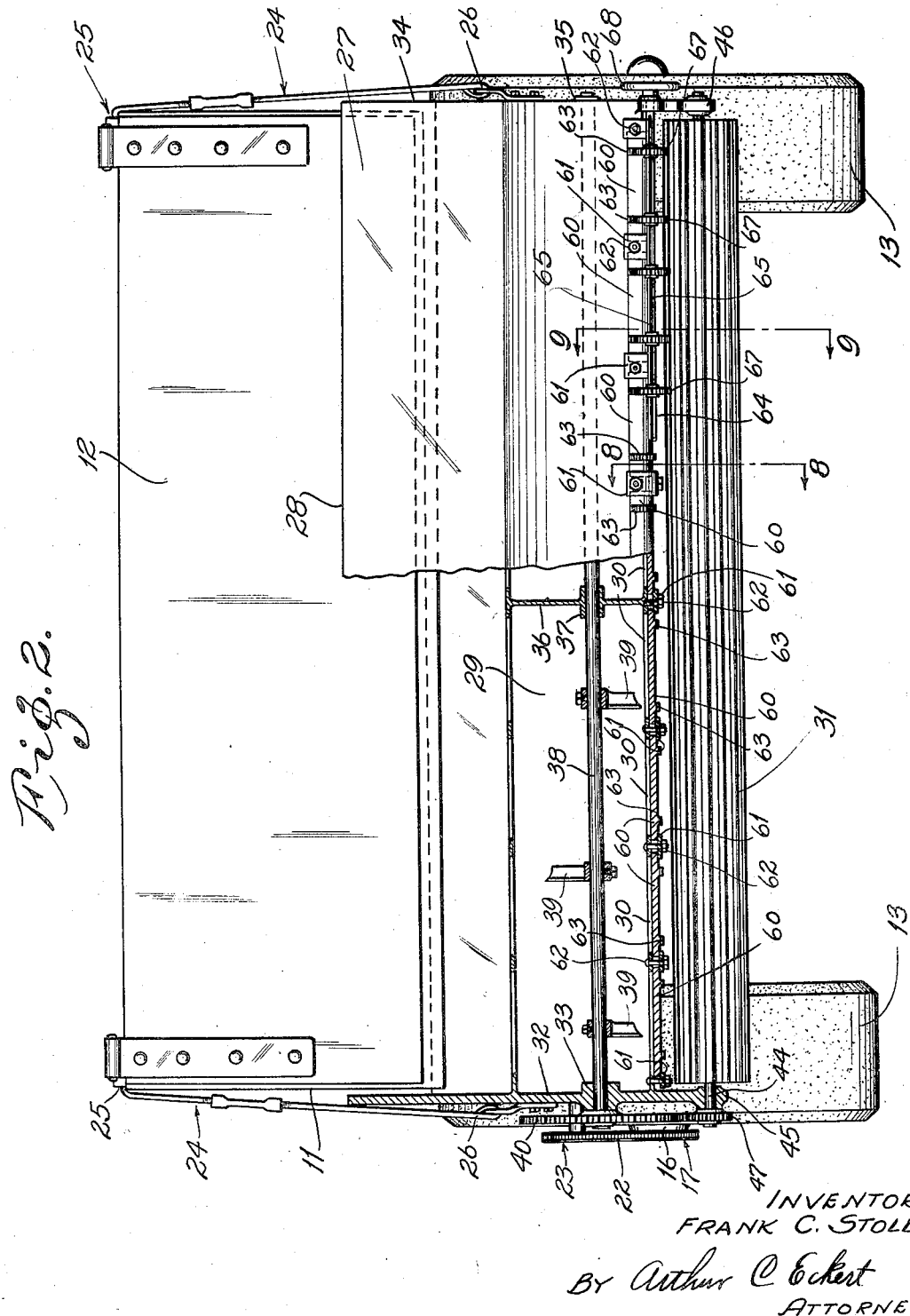

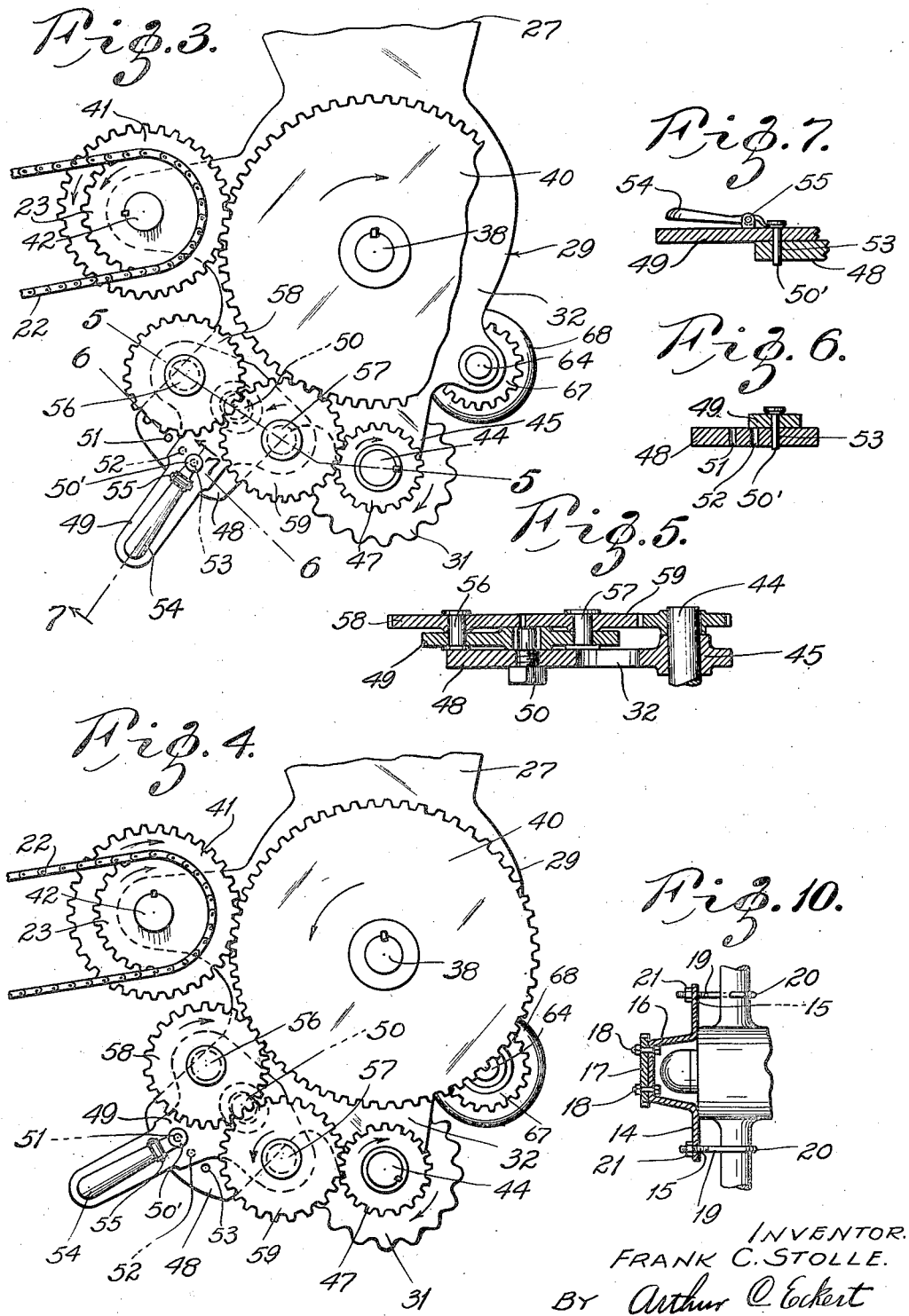

Patented Apr. 8, 1930

1,753,811

UNITED STATES PATENT OFFICE

FRANK C. STOLLE, OF WEBSTER GROVES, MISSOURI, ASSIGNOR TO STOLLE ROAD EQUIPMENT CO., OF ST. LOUIS, MISSOURI, A CORPORATION OF MISSOURI

ROAD-MATERIAL SPREADER

Application filed February 29, 1928. Serial No. 257,907.

The object of my device is to make a road material spreader that may be selectively attached to a vehicle either driven by mechanical power or animal power. My device finds particular application in spreading sand and gravel, etc., on roads in their building and maintenance. A further object is to distribute material of the character indicated evenly and to have it ejected rearwardly from the vehicle when the vehicle is being moved either forwardly or rearwardly. A still further object of my device is to devise a spreader that may be selectively made inoperative when the vehicle to which it is attached is in motion and in which the width of the spreading may be varied to meet the requirements of roads of varying widths. My device is so constructed that material may be spread in narrow strips where the strips are not contiguous. The advantage of this is that it may be desirable to spread road material in such strips either in the repair of the road or in its construction.

A still further object is to devise a spreader for road material which spreader is actuated by the power from the motion of the vehicle. In my device the movement of the rear axle of the vehicle is transmitted to the spreader. The attaching means of my spreader to the wheel and axle of a vehicle is made so as to accommodate vehicles having wheels of different types and hubs of different sizes. My device is so made that it may be easily attached and removed from the vehicle so that the spreader may be used with different vehicles consecutively. My device is made of few and simple parts that lend themselves readily to multiple production, that may be easily and simply manufactured and assembled, and may be made and assembled at small cost.

With these and other objects in view, my invention has relation to certain novel features of construction and arrangement of parts as will be hereinafter more fully described, pointed out in the claims, and illustrated in the drawings in which:

Fig. 1 is a side elevation of the rear end of a vehicle showing my device attached.

Fig. 2 is an end elevation of a vehicle showing my device attached.

Fig. 3 is an enlarged end elevation of my device showing the gear and sprocket connection for attachment to the driving element of the vehicle and showing the gears in mesh as they will be when the vehicle is being moved forwardly.

Fig. 4 is a view similar to Fig. 3 showing the gears in mesh as they will be when the vehicle is backed up.

Fig. 5 is a sectional elevation on the line 5—5 of Fig. 3.

Fig. 6 is a sectional elevation on the line 6—6 of Fig. 3.

Fig. 7 is a fragmental sectional elevation on the line 7—7 of Fig. 3.

Fig. 8 is a transverse sectional elevation of the hopper and spreader used in my device showing the means of selectively opening and closing the opening in the hopper.

Fig. 9 is a fragmental sectional elevation of the hopper and gate therefor and means of actuating the gate.

Fig. 10 is a sectional elevation on the line 10—10 of Fig. 1 showing the mechanism that must be attached to the wheel of the vehicle in order to utilize the vehicle wheel as the driving mechanism of my device.

Numeral 11 designates the conventional vehicle having the conventional tail gate 12 and the wheels 13.

Since my device is driven by a chain and sprocket from the rear wheel of the vehicle, I will first describe the detachable means of securing the sprocket to the rear wheel. This sprocket connection consists of a circular plate 14 having holes 15 formed therein at intervals circumferentially as shown. In the center of the circular plate 14 is formed the enlargement 16 which is of such size as to conveniently fit over the external portion of the hub of any conventional wheel. To the enlargement 16 and centrally positioned is secured the sprocket wheel 17 by means of the bolts 18. Numerals 19 designate bolts having the hooks 20 formed at one end and threaded at the opposite end with the nuts 21 in threaded engagement with the free end of the hooks 20. The assemblying is the following. The hooks are passed through holes 15 and the nuts 21 then secured as shown in Fig. 10. The hooks 20 are then hooked around the spokes of the wheel and the nuts 21 tightened. This tightening permanently secures the circular plate 14 to the wheel. In the event that disk wheels are employed it is necessary to drill holes such as 15 in the disk. In this situation the hooks 20 are used as before with the exception that the hooks engage the disk on its inner surface rather than spokes.

Numeral 22 designates a sprocket chain which is in mesh with the sprocket wheel 17 and the other end of the sprocket chain 22 is in mesh with the sprocket wheel 23, which is a portion of the spreading device proper. My device is secured to the vehicle by any conventional selective means such as turn buckles and rods 24 which are hooked at one end as at 25 to the vehicle and at the other end to the spreading device as at 26.

Numeral 27 designates a hopper having the trough portion 28 and the mixing chamber 29. The hopper 27 is secured to the vehicle in such relationship that when the tail gate 12 is opened the material to be spread may be directly dumped therein. The material passes into the hopper 27, into the mixing chamber 29, where any particles that have not been thoroughly comminuted are broken up to the proper consistency. The material then passes through slots 30 in the bottom of the mixing chamber 29 and falls on to the spreader 31, from which it is ejected rearwardly through the rotation of the spreader 31 in a clockwise direction. It will be seen that the direction of rotation of the wheels of the vehicle changes when the direction of movement of the vehicle changes, but that the rotation of the spreader 31 must always be in a clockwise direction otherwise the material would not be ejected rearwardly from the vehicle. It becomes necessary therefore to interpose mechanism that will selectively maintain the clockwise rotation of the spreader 31 irrespective of the direction of the rotation of the vehicle wheels. By my device the mere shifting of a handle from one position to another accomplishes this result. The normal movement of the vehicle is in a forward direction and by this movement my device is so designed that the spreader 31 will rotate in a clockwise direction. When the vehicle is backed up in order to maintain the clockwise rotation of the spreader 31, the handle is shifted arcuately. It is likewise desirable that the spreader remain inoperatve at certain times when the vehicle is moved. For instance, a certain portion of a road may not require any material on it and yet it would not be of sufficient length to justify the removal of my device from the vehicle. In this situation the movement of this same handle arcuately to a neutral position prevents the rotation of the spreader although the vehicle may move in either direction. Numeral 32 designates the end plate of the mixing chamber 29 and has the journal 33 formed therein centrally relative the center of the cross section of the mixing chamber 29. A plate 34 forms the closure for the opposite end of the mixing chamber 29 and has the journal 35 formed therein centrally positioned relative the cross section of the mixing chamber 29. The strengthening web 36 is positioned centrally in the mixing chamber 29 and has the journal 37 formed therein centrally.

Numeral 38 designates a shaft passing through journals 33, 37 and into 35. The shaft 38 protrudes slightly beyond the end plate 32. On the shaft 38 are secured the paddles 39. To the external end of the shaft 38 is keyed the gear 40.

The sprocket wheel 23 is secured to the gear 41, which gear 41 is in mesh with gear 40. Sprocket wheel 23 and gear 41 are mounted on shaft 42 which is journaled in the casting 43.

It will be seen that by the device thus far described a movement of the vehicle in either direction will rotate the shaft 38. The spreader 31 consists of a shell having a corrugated surface, the corrugations being formed longitudinally relative the shell. Numeral 44 designates a shaft to which the spreader 31 is attached. The shaft 44 is journaled in one end in the journal 45 formed in a depending projection from the end plate 32 and at the other end in the journal 46 formed in a depending projection from the plate 34. To the shaft 44 external to the journal 45 is keyed the gear 47. To the frame projection 48 is pivotally secured the casting 49 by means of the stud 50. For selectively securing the casting 49 to the frame projection 48 in three different positions, the pin 50' and the holes 51, 52 and 53 formed in the frame projection are provided.

The purpose of these three holes is to provide three securing points. The pin 50' may selectively be positioned in either hole 51, 52 or 53. The pin 50' passes through a hole in the casting 49. Numeral 54 designates a handle which is pivotally secured to the casting 49 at 55. The one end of the handle engages the pin 50'. By a movement of the handle 54 therefore the pin 50' may be disengaged as the occasion requires. In the casting 49 are journaled two shafts 56 and 57. On the shaft 56 is mounted the gear 58. On the shaft 57 is mounted the gear 59. Gears 58 and 59 are always in mesh with each other. When the casting 49 is in the position shown in Fig. 3, the gear 59 is in mesh with gear 47 as well as gear 40.

This is a normal operating position when the truck is moving forwardly. The direction of rotation of the various gears is indicated by the arrows on the drawing. It will be seen that the spreader 31 is moved in a clockwise direction when the vehicle is moving and the gears are in the position indicated.

When the gears are in the position shown in Fig. 4, that is, when the gear 59 is out of mesh with the gear 40 and gear 58 is in mesh with gear 40, which is the case when the direction of motion of the vehicle is reversed, that is, when it is backed up, the spreader will likewise be rotated in a clockwise direction.

When the pin 50' is positioned in hole 52, the gear 40 will not be in mesh with either gears 58 or 59 and a rotation therefore of gear 40 will not rotate gear 47 and hence not spreader 31. This is the neutral position that is taken when it is desired to move the vehicle but not to spread material. The hole in the casting 49 in which the stud 50 is positioned is slightly elliptical as shown in Figs. 3 and 4 to permit a movement, slightly, laterally of the casting 49 in order to facilitate the gear engagement.

In order to control the flow of material from the slots 30, 8 of which are provided, gates 60 are provided. These gates are arcuated to the same arc as the wall of the mixing chamber 29. There are as many gates 60 as slots 30. Arcuated slide ways 61 are secured in spaced relationship to the wall of the mixing chamber 29 adjacent the slots 30 by means of bolts 62. The gates 60 slide between the arcuated slide ways 61 and the outer wall of the mixing chamber 29. The gates 60 are slightly larger in dimension but of the same shape as the slots 30 so that when the gates 60 are moved across the slots they completely cover them. It is an advantage to be able to move each of the gates 60 independently of the others manually or to actuate them all at the same time and to do this easily and from the side of the truck. To accomplish this an arcuated rack 63 is secured to each of the gates 60.

Numeral 64 designates a shaft journaled in a depending portion of plate 34 at one end and in a depending portion of end plate 32 at the other end. It is slotted as shown at 65 longitudinally for its entire length. A key 66 is positioned in this slot. The slotted pinions 67 are slid over the slotted and keyed shaft 64. It will be seen that by this construction that the pinions may be slid along the shaft but will not turn on the shaft. There are two pinions 67 provided for each gate 60. These pinions may be pushed in and out of engagement with the racks 63. When the shaft 64 is rotated manually by turning the handle 68, the pinions 67 will be rotated and the racks 63 with which they are in mesh will be rotated, thereby opening or closing the actuated gate. It will be seen that the pinions that are not in mesh with a rack will not actuate a gate. By these means all of the gates may be conveniently opened or closed.

What I claim and mean to secure by Letters Patent is:

1. In a device of the character described, a mixing chamber, a spreader, said spreader positioned relative to said mixing chamber so that material placed in said mixing chamber will be fed on to said spreader, a gear mounted on said spreader to rotate the same, a gear secured to said mixing chamber, a driving gear in mesh with the gear on said mixing chamber, an auxiliary pair of gears in mesh with each other and in mesh with the gear on said spreader and means for selectively placing each gear of said pair of gears in mesh with the gear on said mixing chamber.

2. In combination with a casting, a pair of gears in mesh with each other, secured to separate shafts on said casting, a frame element, said casting pivotally secured to said frame element, a spreader having a gear formed at one end to rotate the same, one of said pair of gears always in mesh with said gear, a mixing chamber having a gear formed at one end, and means for locking either of said pair of gears in mesh with the gear on said mixing chamber, said means comprising a pin secured to said casting, passing through a hole therein, holes formed in the frame, the frame and casting being in such relative position that said pin may be inserted in the holes of said frame.

In testimony whereof I affix my signature.

FRANK C. STOLLE.